July 21, 1931.  J. V. ARMSTRONG ET AL  1,815,729
WINDING MECHANISM
Filed Oct. 20, 1927  2 Sheets-Sheet 1
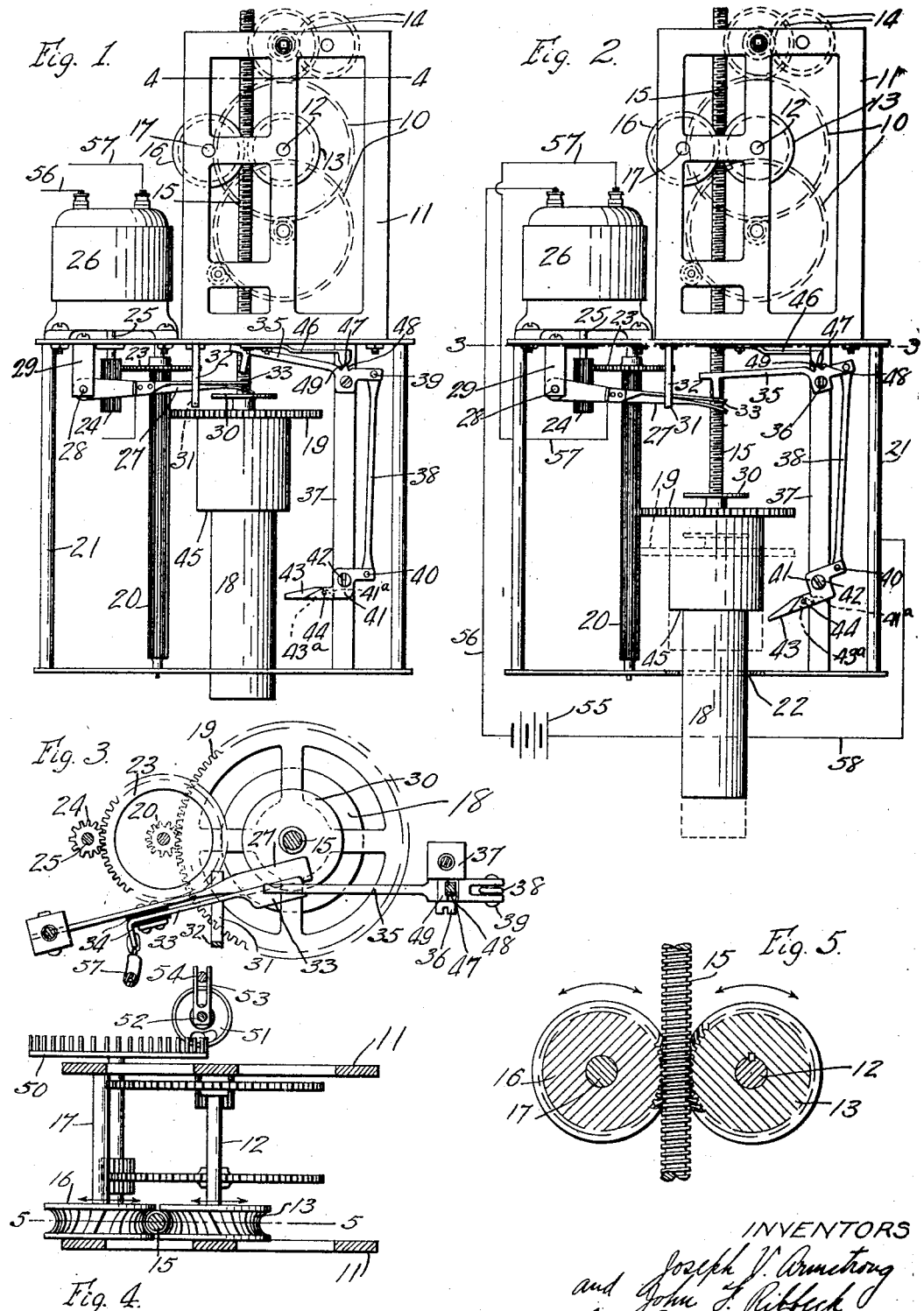
INVENTORS
Joseph V. Armstrong
and John F. Riffeck
by Parker & Crochnow
ATTORNEYS.

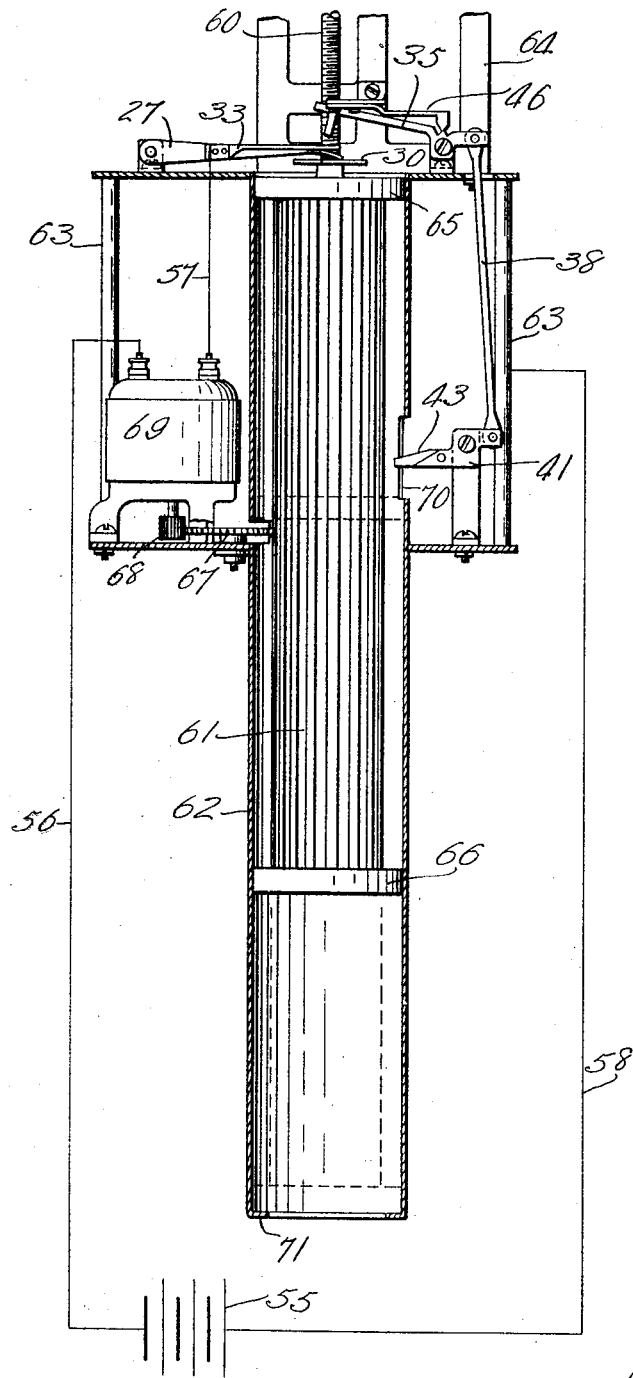

Patented July 21, 1931

1,815,729

UNITED STATES PATENT OFFICE

JOSEPH V. ARMSTRONG AND JOHN F. RIBBECK, OF AKRON, NEW YORK

WINDING MECHANISM

Application filed October 20, 1927. Serial No. 227,446.

This invention relates to winding mechanism for mechanical motors of the type useful in clocks and other devices, and particularly to self-winding mechanism therefor.

An object of this invention is to generally improve and simplify winding mechanisms for clocks and other mechanical motors.

A further object of the invention is to provide an improved winding mechanism for clocks and other mechanical motors, with which the driving operations will not be interrupted or the driving force varied during the rewinding operations; with which when self-winding the clock or motor may continue to operate under the same driving force for a considerable interval of time after the mechanism is set for rewinding, and with the mechanism remaining set for rewinding, even if there should be a temporary failure of the rewinding power; and which will be relatively simple, compact, durable, dependable, quiet in operation and inexpensive.

A further object is to provide an improved self-winding mechanism for clocks and the like, with which great accuracy in operation of the clock or other motor may be obtained.

Various other objects and advantages will be apparent from the following description of one embodiment of the invention, and the novel features will be particularly pointed out hereinafter in connection with the appended claims.

In the accompanying drawings:—

Fig. 1 is a side elevation of a clock constructed in accordance with this invention;

Fig. 2 is a somewhat similar elevation but with the parts in another operative condition;

Fig. 3 is a sectional plan of the same, the section being taken approximately along the line 33 of Fig. 2;

Fig. 4 is a sectional plan of the same, with the section taken approximately along the line 4—4 of Fig. 1;

Fig. 5 is a sectional elevation of a portion of the same, with the section taken approximately along the line 5—5 of Fig. 4; and Fig. 6 is a fragmentary elevation, similar to Fig. 1, of a winding mechanism of slightly modified construction and on a scale somewhat larger than said Fig. 1.

In the illustrated embodiment of the invention shown in Figs. 1–5, a clock or mechanical train 10 of any suitable construction may be mounted in the usual frame 11. The clock train 10 may have a power shaft 12 carrying a worm wheel 13 by which it is driven. The clock train may also mesh with and drive the usual hour hand train 14, as usual in clocks. A worm screw 15 extends approximately tangentially to and meshes with the worm wheel 13, the worm screw being confined in meshing relation with the worm wheel 13 by any suitable guiding means such as a second worm wheel 16 disposed on the opposite side of the worm screw and meshing therewith, the worm wheel 16 being rotatably mounted in the clock frame by a shaft 17. The worm screw 15 acts as a rack upon the worm wheel 13 to drive the latter when the worm screw is moved endwise, and while so acting as a rack and driving the worm wheel 13, it will be obvious that the worm screw may be concomitantly moved past the worm wheel if the worm screw is rotated, even though being urged endwise as a rack at the same time.

The worm screw is yieldingly biased for endwise movement in one direction in any suitable manner but preferably by a weight. In the particular example, the worm screw is mounted in a vertical position and a weight 18 is secured to the lower end thereof so as to yieldingly bias the worm screw endwise in a downward direction with a constant driving force. The force of the weight 18 is thus transmitted by the worm screw 15 to the worm wheel 13, and through the latter to the power shaft 12 and the clock or other mechanism to be driven. The worm screw may be provided with a gear 19 which meshes with an axially elongated pinion 20 that is disposed parallel to and adjacent the worm screw 15. The pinion 20 is rotatably mounted in a suitable frame 21 which is secured to the bottom part of the clock frame 11. The weight 18 is preferably guided in its descent by passage through an aperture 22 in the lower plate of the frame 21. A gear 23 is secured to the pinion 20 for rotation therewith and in turn meshes with a pinion 24 carried by the shaft 25 of a suitable power motor 26. This power motor is preferably an electrical motor and it may be mounted upon the frame 21.

A lever 27 is hinged by a pin 28 to a depending bracket arm 29 of the frame 21, and extends into the path of an abutment surface 30 provided at the lower end of the screw 15. When the worm screw is moved upwardly, the abutment surface 30 will engage with the lever 27 and rock it upwardly. When the worm screw descends, the downward or following movement of the lever 27 will be limited by a horizontally extending branch or arm 31 (Fig. 3) of a depending bracket 32 of the frame 21. A spring contact 33 is secured to the lever 27 in any suitable manner, and is insulated therefrom also in any suitable manner, such as by insulating washers 34 (Fig. 3).

A contact arm 35 is hinged as at 36 to a suitable post 37 of the frame 21, and one end thereof extends into the path of movement of the spring contact 33 of the lever 27. A link 38 is pivotally connected at one end by a pin 39 to the arm 35, and at its other end is connected by a pivot pin 40 to a control lever 41 which in turn is pivoted at 42 to the post 37. A pawl 43 is pivoted at 44 to the free end of the lever 41 in a slot 41a thereof, so as to be free to rotate thereon upwardly but limited in its downward movement thereon to a straight out position by engagement of a tail 43a with the bottom of slot 41a. The weight 18 or the gear 19 may have a second abutment surface 45 which is adapted to engage with the pawl 43 as the weight descends. A spring arm or latch 46 is secured at one end to the frame 21 and provided at its end with a pointed or V-shaped nose 47 engageable alternately with adjacent V-shaped notches 48 and 49 provided in the contact arm 35 adjacent the pivot 36 thereof. As the nose 47 of the latch leaves one notch in the contact arm it immediately snaps into the other, and by the cam action between the nose and the walls of the grooves 48 and 49, the contact arm 35 will be yieldingly biased in both directions from an intermediate position in which the nose is between the two grooves 48 and 49.

The clock or gear train 10 which is driven by the worm screw may be controlled in any suitable manner. In clock mechanism the train 10, may, for example, be controlled by an escapement wheel 50 cooperating with an oscillating escapement disc or member 51 carried by a crutch shaft 52. The shaft 52 carries a forked crutch arm 53 which embraces a pendulum rod 54, as usual in clock mechanism. The pendulum in oscillating rocks the forked crutch arm 53 and the latter in turn rocks the crutch shaft 52 and through it the escapement 51. The latter in turn permits step by step movement of the escapement wheel 50 and during this step by step movement the escapement wheel imparts slight forces to the escapement disc 51 tending to keep it and the pendulum in oscillation, all as well known in the art of horology, and for that reason a further detailed description is omitted in the interest of clarity.

The operating power for the motor 26 may be any source of electricity such as an electric light circuit whose current has been transformed, if necessary, to a suitable voltage, but for convenience and simplicity of this description, the source of energy has been illustrated as a battery 55. A wire 56 connects this source of energy to one terminal of the motor 26 and the other terminal of the motor is connected by a wire 57 to the spring contact 33. The other side of the battery 55 is grounded by wire 58 to the frame 21.

In the operation of a device constructed as hereinbefore described and illustrated, let it be assumed that the weight 18 is in its upper position, as shown in Fig. 1. The weight will bias the worm screw 15 downwardly, and the latter will drive the worm wheel 13 and through it the mechanical motor or clock train. During this downward movement of the weight, the worm screw acts as a rack upon the worm wheel 13 and disengagement of the worm screw from the worm wheel will be prevented by the second worm wheel 16. The rate of descent of the weight 18 will be controlled by the pendulum and escapement or other controlling means. After the weight 18 has descended for a given extent, the abutment surface 45 will engage with the pawl 43 and rock it and the lever 41 from the position shown in Fig. 1 towards the position shown in Fig. 2.

The lever 41 will act through the link 38 to rock the contact arm 35 until the latch nose 47 begins to pass into the notch 48 whereupon the latch spring and its nose 47 will cam the arm 35 further in the same direction into the position shown in Fig. 2 in which the arm 35 engages with the spring contact 33. Thereupon the arm 35, which is grounded, will, by its engagement with the spring contact 33, complete a circuit through the motor 26. The motor will thereupon drive the pinion 20 and the latter will drive the gear 19 to rotate the worm screw 15. During rotation of the worm screw, the force of the weight 18 will continue to be exerted uniformly upon the worm screw 15 tending to move it endwise, and therefore, although the worm screw is being rotated, it will also continue to act as a rack and drive the worm wheel 13. As the worm screw 15 rotates, it will, by its engagement with the worm wheel 13, be moved past the worm wheel and elevated thereby, since during this rotation of the screw 15 the worm wheel will, in effect, be relatively stationary. In this manner the worm screw and its weight 18 will be elevated while still continuing to drive the clock or gear train with the same driving force.

As the weight 18 and worm screw move upwardly the abutment surface 30 will engage the lever 27 and rock it upwardly, thus also shifting upwardly the contact 33 and the arm 35. When the arm 35 has been moved upwardly past the intermediate position, the nose 47 of the latch 46 will snap over into the notch 49, whereupon the latch 46 and its nose 47 will cam the arm 35 further upwardly and rapidly into the position shown in Fig. 1, and in doing so will return the lever 41 into the position shown in Fig. 1 in which the pawl 43 will again be in the path of the abutment surface 45. When the arm 35 is snapped upwardly in this manner, it will move quickly out of engagement with the contact spring 33 thereby opening the circuit of the electric motor 26 rapidly so as to prevent arcing, and thereupon the motor will stop and the weight 18 and worm screw will again descend slowly as they drive the clock train. The operation will then continue as just described. The pitch of the worm screw, the friction and inertia of the moving parts and the gearing to the screw from the motor prevent reverse rotation of the screw as it hangs from the worm wheels.

The lever 41 is preferably disposed for operation by the abutment surface 45 at some considerable time prior to the limit of downward movement of the weight, so that if for any reason the source of electric energy 55 should temporarily fail, the weight will continue to drive the clock train for a considerable interval and then as soon as the source of current is restored, the motor 26 will immediately and without attention be operated to rewind or reset the weight 18 into its upper position where it possesses potential energy. If the current should fail entirely, the abutment surface 45 may rest upon the lower plate of the frame 21 at the end of its movement, and stop further downward movement of the worm screw before the worm screw becomes disengaged from the worm wheel 13.

The construction illustrated in Figs. 1 to 5 is well adapted for operating relatively small clocks or other devices. With large clocks, such as tower clocks, for example, the elongated pinion 20 would be so long that it would tend to flex in use. This objection would be overcome by a construction such as that illustrated in Fig. 6. In this arrangement the worm screw 60 is operatively connected by a worm wheel to the gear train (not shown) as before, but the weight at the lower end of said worm screw is made in the form of a large elongated pinion or gear 61, preferably disposed within a tubular housing or guide 62, secured to, and extending below a frame 63 below the clock frame 64. The gear weight 61 is guided in the housing 62 by collars 65 and 66 secured to the weight at its upper and lower ends and slidably engaging the inner wall of said housing. The gear weight is driven, for example, by a gear 67 journalled on the frame 63 and which extends through an opening in the housing. This gear, in turn, meshes with a pinion 68 on the shaft of a suitable motor 69 mounted at the lower end of the frame 63 in such position that the use of a longitudinal driving pinion is obviated. The same arm 27, spring contact 33, arm 35, link 38, control lever 41, pawl 43 and latch 46 used on the first construction can be employed in the present arrangement. The pawl 43 extends through a slot 70 in the housing 62 so as to be engaged by the upper collar 65 of the weight to cause the closing of electrical circuit for returning the weight 61 and its attached worm screw 60 to upper position. Should the source of electrical energy be temporarily interrupted, the weight will eventually come to rest on the flange or bottom wall 71 of the housing 62. The contact member 33 is actuated by the upward movement and engagement therewith of the abutment 30 as before.

It will be obvious that various changes in the details, which have been herein described and illustrated in order to explain the nature of the invention, may be made by those skilled in the art within the principle and scope of the invention as expressed in the appended claims.

We claim as our invention:—

1. A winding mechanism for mechanical motors of clocks and other devices having a power shaft, comprising a rotary worm wheel for connection to said power shaft, a worm screw meshing approximately in a tangential direction with said worm wheel and free to move endwise of itself and to rotate about its own axis, means for urging said worm screw yieldingly in an endwise direction and causing operation of the screw as a driving rack tending to rotate said worm wheel, and means for rotating said worm screw to cause endwise movement thereof against the action of said urging means, and having driving engagement with the exterior of the screw throughout its descent and rise.

2. A winding mechanism for mechanical motors of clocks and other devices having a power shaft, comprising a worm wheel connected to and driving said shaft, a worm screw extending approximately tangentially to and meshing with said worm wheel, means for urging said worm screw yieldingly in an endwise direction and thereby causing operation of said screw as a rack to drive said worm wheel, a winding motor, and a driving connection between said motor and the exterior of said worm screw for causing rotation of said worm screw without restricting its endwise movement, and operable throughout the entire endwise movement of said worm screw, whereby said worm screw may be rotated to move it endwise past the worm wheel without disengaging it therefrom and without interrupting the rack and gear driving action between the worm screw and worm wheel.

3. A winding mechanism for mechanical motors of clocks and other devices having a power shaft, comprising a worm wheel connected to and driving said shaft, a worm screw extending approximately tangentially to and meshing with said worm wheel, means for urging said worm screw yieldingly in an endwise direction and thereby causing operation of said screw as a rack to drive said worm wheel, an electric motor, a driving connection between said motor and the exterior of said worm screw for causing rotation of of said worm screw without restricting its endwise movement, and operable throughout the entire endwise movement of said worm screw, whereby said worm screw may be rotated to move endwise past the worm wheel without disengaging therefrom and without interrupting the rack and gear driving action between the worm screw and worm wheel, a source of current, a circuit for said motor including said source of current, and said motor, and a contact device also included in said circuit and closed automatically to start operation of said motor when said worm screw has moved endwise in a worm wheel driving direction for a predetermined extent, and operable by the worm screw to open the circuit automatically when the motor has rotated the worm screw to move it backwardly past the worm wheel and reset it for a new driving position.

4. A winding mechanism for mechanical motors of clocks and other devices having a power shaft, comprising a rotary worm wheel connected to and driving said power shaft, a worm screw extending approximately tangentially to and meshing with said worm wheel to act as a driving rack therefor when moved endwise, and independently movable along the worm wheel by its rotation while driving the same, means for biasing said worm screw yieldingly in one endwise direction without restricting its rotation, a gear connected to and moving with said worm screw, a second gear meshing therewith, one of said gears being elongated to permit relative sliding movement therebetween throughout the endwise movement of said worm screw, and means including a motor connected to and rotating said second gear to cause movement of said screw, by its rotation, past the worm wheel and against said biasing means to reset it.

5. A winding mechanism for mechanical motors of clocks and other devices having a power shaft, comprising a rotary worm wheel connected to and driving said power shaft, a worm screw extending approximately tangentially to and meshing with said worm wheel to act as a driving rack therefor when moved endwise, and independently movable along the worm wheel by its rotation while driving the same, means for biasing said worm screw yieldingly in one endwise direction without restricting its rotation, a gear connected to and moving with said worm screw, a second gear meshing therewith, one of said gears being elongated to permit relative sliding movement therebetween throughout the endwise movement of said worm screw, means including a motor connected to and rotating said second gear to cause movement of said screw, by its rotation, past the worm wheel and against said biasing means to reset it, and means including a circuit controlled by the worm screw during its endwise movements for causing operation of said motor to reset the worm screw while the latter drives said worm wheel, and for stopping said motor when said screw has been reset.

6. A winding mechanism for mechanical motors of clocks and other devices having a power shaft, comprising a rotary worm wheel connected to and driving said power shaft, a worm screw extending approximately tangentially to and meshing with said worm wheel to act as a driving rack therefor when moved endwise, and independently movable along the worm wheel by its rotation while driving the same, means for biasing said worm screw yieldingly in one endwise direction without restricting its rotation, a gear connected to and moving with said worm screw, a second gear meshing therewith, one of said gears being elongated to permit relative sliding movement therebetween throughout the endwise movement of said worm screw, means including a motor connected to and rotating said second gear to cause movement of said screw, by its rotation, past the worm wheel and against said biasing means to reset it, and means including a circuit controlled by the worm screw during its endwise movements for causing operation of said motor to reset the worm screw while the latter drives said worm wheel, and for stopping said motor when said screw has been reset, said circuit means permitting continued driving movement of said worm screw for a considerable period after said circuit means has been operated to cause resetting, whereby in the event of failure of energy for said circuit means, said worm screw may continue to drive said power shaft and said motor may become operative at once upon restoration of energy to said circuit means.

7. In a winding mechanism for mechanical motors of clocks and the like having a power shaft, comprising a worm wheel connected to and driving said power shaft, a worm screw extending approximately tangentially to and meshing with said worm wheel and acting as a rack thereon to drive the worm wheel by its endwise movements, guiding means for holding said worm screw in meshing relation with said worm wheel without restricting endwise movement of the worm screw, a power motor having a sliding driving connection to said worm screw for rotating the same while permitting endwise movement of said worm screw, means for yieldingly urging said worm screw in an endwise direction and thereby driving said worm wheel, and means operable automatically at a selected point in the endwise movement of said worm screw for causing operation of said power motor to rotate said worm screw to reset it in its driving relation to said worm wheel without interrupting its driving connection to said worm wheel.

8. A winding mechanism for mechanical motors of clocks and the like, comprising a power shaft, a worm wheel connected to and driving said power shaft, a worm screw extending approximately tangentially to, meshing with and driving said worm wheel when moved endwise and tangentially of said worm wheel, means for confining said worm screw against said worm wheel without limiting said endwise movement, a weight connected to said worm screw for causing endwise movements thereof, external gear teeth disposed about the periphery of said weight, a gear wheel meshing with said gear teeth for rotating said screw at any point in its endwise movement, and a power device operable automatically at one point in the movement of said worm screw for causing operation of said gear wheel to rotate said worm screw and return it past said worm wheel without interrupting its driving action on said worm wheel, and for then stopping itself at another desired point in the movement of the worm screw.

9. A winding mechanism for clocks and the like, comprising a driving member movable in a prescribed path, said member being returnable in a reverse direction for the storing of potential energy therein, an electrical device for returning said driving member to restore potential energy therein, a lever disposed in the path of said member at approximately the end of its movement in a resetting direction, whereby said member will engage and move said lever as it approaches the end of its resetting movement, a contact member carried by said lever and movable therewith, an arm extending into the path of movement of said contact member when the latter is moved with said lever at the end of a resetting movement of said driving member, a controlling circuit for said electrical device including said arm and said contact member and rendered effective by the engagement of said arm and contact member, means acting on said arm for biasing it in opposite directions from an intermediate position in one of which directions it is movable into engagement with said contact member, means operated by said driving member after a driving operation of selected duration for causing movement of said arm towards engagement with said contact member past said intermediate position, the operation of said lever by said driving member at the end of the resetting movement of the driving member shifting said arm past said intermediate position whereupon said arm automatically moves under its bias out of engagement with said contact member to stop operation of said device.

10. A winding mechanism for mechanical motors of clocks and other devices comprising a power shaft, a worm wheel connected to and driving said shaft, a worm screw meshing with and driving said worm wheel and extending approximately tangentially thereto, whereby endwise movement of said worm screw will cause a rotation of said worm wheel and rotation of said worm screw will move it past said worm wheel without interrupting its driving action thereon, means for biasing said worm screw in one direction to drive said worm wheel, means for rotating said worm screw to reset it against said bias, contact mechanism biased from an intermediate condition into open and closed position and controlling said resetting means, said contact mechanism having control parts disposed in the path of travel of said worm screw for operation thereby, automatically at selected points in its endwise movement.

11. A winding mechanism for clocks and the like, comprising a driving member movable endwise and also rotatable, a supporting frame, said driving member carrying a pair of spaced abutments, a lever extending into the path of one of said abutments and operable thereby at one limit of movement of said member, a spring contact carried by said lever, an arm pivoted on said frame and biased from an intermediate position toward and from said contact, and means including a part exposed in the path of travel of the other abutment and connected to said arm for rotating it past said intermediate position to cause its movement into engagement with said contact after said member has moved for a limited extent in one direction, means for limiting the movement of said lever toward said one of said abutments, and means rendered effective by the engagement of said contact and said arm for moving said member in a direction to cause operation of said lever by its cooperating abutment until said arm is moved past said intermediate position.

12. A winding mechanism for clocks and the like, comprising a worm wheel, a worm screw meshing with said wheel and by endwise movements driving it, means for biasing said screw for endwise movement in one direction, and means for rotating said screw, independently of its endwise movement, in direction to move it endwise relatively to said wheel oppositely to its driving action on said wheel, and having a sliding and rotary driving connection to the exterior periphery of the screw.

13. A winding mechanism for clocks and the like, comprising a worm screw, a pair of worm wheels, on opposite sides of, meshing with, and confining between them, said screw with the screw depending therefrom, a weight carried by the lower end of said screw for pulling the screw downwardly and thereby driving said worm wheels, a power shaft connected to and driven by one of said wheels, gear teeth disposed around the periphery of said weight, a gear wheel meshing with said gear teeth and along which the latter slide while in mesh therewith, and means for rotating said gear wheel to elevate said screw and weight without varying or interrupting the pull of the screw on said worm wheels.

14. A winding mechanism for mechanical motors of clocks and other devices having a power shaft comprising a worm wheel connected to and driving said shaft, a worm screw extending approximately tangent to and meshing with said worm wheel, means for urging said worm screw yieldingly in an endwise direction and thereby causing operation of said screw as a rack to drive said worm wheel, means including an electric motor for rotating said worm screw to elevate it without stopping the driving action on said worm wheel, a pair of levers disposed at different points along the travel of said screw and engaged and rocked by said screw as the latter moves thereby, a link connecting said levers, and contact mechanism operated by one of said levers for closing the circuit of said motor when said screw has dropped to a position to engage and rock one of said levers, and operated from the other of said levers and said link to open the circuit of said motor when the screw has been elevated through its rotation to a desired point.

JOSEPH V. ARMSTRONG.
JOHN F. RIBBECK.